Dec. 17, 1935.  D. B. PERRY  2,024,474
FLEXIBLE COUPLING
Filed July 18, 1934  3 Sheets-Sheet 1

INVENTOR.
David Barnes Perry
BY
Synnestvedt & Lechner
ATTORNEYS

Dec. 17, 1935.  D. B. PERRY  2,024,474
FLEXIBLE COUPLING
Filed July 18, 1934  3 Sheets-Sheet 2

INVENTOR.
David Barnes Perry
BY
Symnestvedt + Lechner
ATTORNEYS

Dec. 17, 1935.  D. B. PERRY  2,024,474
FLEXIBLE COUPLING
Filed July 18, 1934  3 Sheets-Sheet 3

INVENTOR.
David Barnes Perry
BY
Synnestvedt & Lechner
ATTORNEYS

Patented Dec. 17, 1935

2,024,474

UNITED STATES PATENT OFFICE 2,024,474

FLEXIBLE COUPLING

David Barnes Perry, Ithaca, N. Y., assignor to Morse Chain Company, Ithaca, N. Y., a corporation of New York Application July 18, 1934, Serial No. 735,769

11 Claims. (Cl. 64—19)

This invention relates to flexible couplings for drivingly connecting rotating members.

One of the primary objects of my invention is the provision of a balanced coupling adapted to take care of parallel or angular misalinement of rotating members to be coupled together.

Another object is to provide a coupling for rotating members employing a pair of counterpart flexible connections so arranged that one counterbalances the other in operation.

A further object of my invention is the provision of a coupling for connecting rotating members of a type employing flexible connecting means located in surrounding relation to the members to be coupled arranged to be in balance in operation.

How the foregoing together with such other objects and advantages as may hereinafter appear or are incident to my invention are realized, is illustrated in preferred form in the accompanying drawings, wherein—

Figure 1:
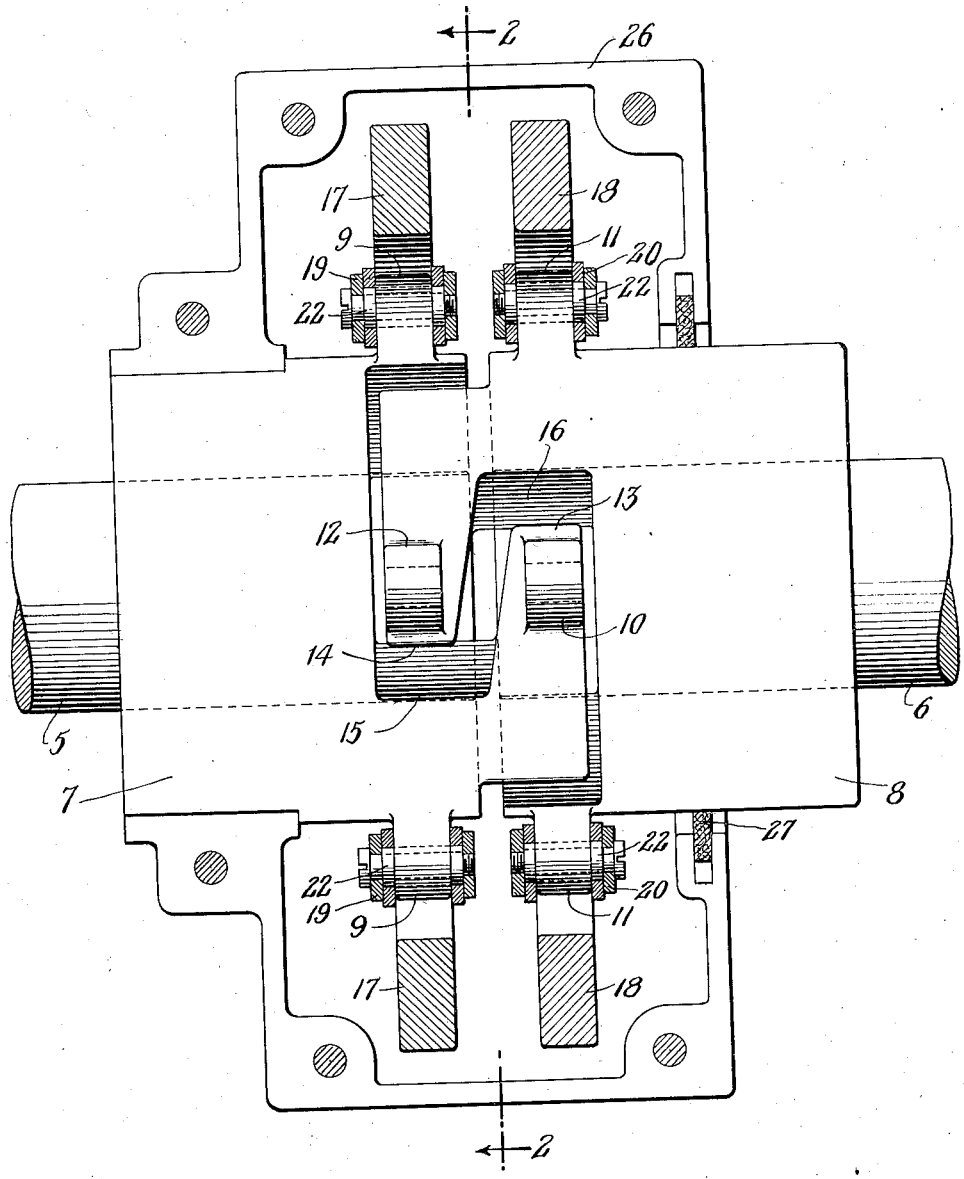
Fig. 1 is a part elevational view and a part longitudinal sectional view of a coupling constructed in accordance with my invention, the parts in section being taken substantially on the line 1—1 of Fig. 2.

In the drawings, I have illustrated my invention employed as a flexible coupling between a driving shaft 5 and a driven shaft 6. A coupling member 7 is secured on the shaft 5 as by means of a key, and similarly a coupling member 8 is secured on the shaft 6. Each of these coupling members is provided with a plurality of external lugs equally spaced circumferentially thereof, and in this instance four such lugs are shown on each member.

As illustrated in Fig. 1, the coupling member 7 has a pair of oppositely disposed vertical lugs 9 located in one transverse plane, and a pair of oppositely disposed horizontal lugs 10 located in another transverse plane spaced from the first plane axially of the shafts. Similarly, the coupling member 8 is provided with a pair of oppositely disposed vertical lugs 11 and a pair of oppositely disposed horizontal lugs 12 located in transverse planes spaced to correspond to the spacing of the lugs on the coupling member 7.

The lugs 10 are located on tongues 13 of the coupling member 7 and the lugs 12 are located on tongues 14 of the coupling member 8, there being undercut portions 15 and 16 between the tongues and the body portions of the coupling members to facilitate assemblage of the coupling members in such relation to each other that the lugs 10 and 11 will lie in one transverse plane and the lugs 9 and 12 in the other spaced transverse plane with sufficient clearance to permit of a reasonable amount of parallel and/or angular misalignment of the shafts and coupling members without interference in operation.

Figure 2:
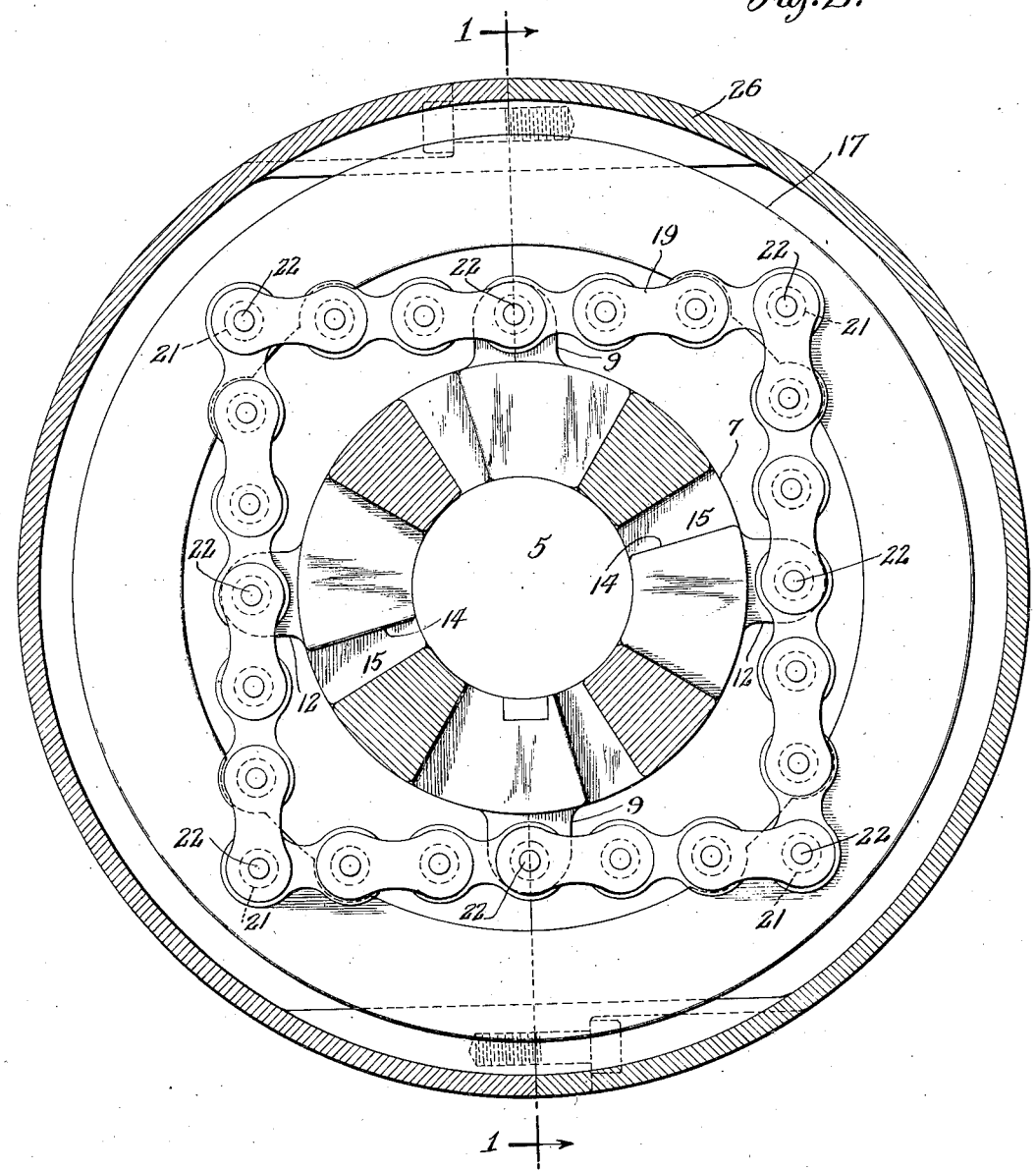
Fig. 2 is a cross section taken on the line 2—2 of Fig. 1.

As will be seen from Fig. 2, I also provide radial clearance between adjacent or interfitting portions of the coupling members of sufficient amount to permit of the misalignment without interference.

Referring now to the manner in which the coupling members 7 and 8 are flexibly connected for drive, I employ flexible means, in this instance in the form of drive chains of the roller type, and floating ring members so constructed and arranged that a balanced coupling is provided, as will now appear.

A pair of ring members 17 and 18 are located in spaced surrounding relation to the coupling members 7 and 8, the ring member 17 being located in the transverse plane of the lugs 9 and 12, and the ring member 18 being located in the transverse plane of the lugs 10 and 11. In the circumferential space between these ring members and the coupling members, a pair of drive chains 19 and 20 are located. The chain 19 is connected to the circumferentially spaced lugs 9 and 12 and to the ring member 17 at circumferential points 21 located between the lugs and the chain 20 is connected to the circumferentially spaced lugs 10 and 11 and to the ring member 18 at circumferential points located between the lugs, it being noted that each chain takes the form of a rectangle, as illustrated in Fig. 2. Hence, each chain is divided into four strands, each of which is stretched from one point of attachment 21, to the next adjacent point of attachment 21, of the ring members. The lugs of the driving and driven members are secured to the central portions of these strands. The attachment of the chains to the lugs of the coupling members and to the ring members is made through the medium of the chain pintles 22.

Since the lugs 10 and 11 of the driving and driven members respectively lie in one transverse plane, and the lugs 9 and 12 of the driving and driven members respectively lie in the other transverse plane, it will be seen that each ring has connection with both coupling members through the medium of the chains.

However, it should be noted that since the lugs 10 and 12 and the lugs 9 and 11 which are adjacent axially of the shafts are on opposite coupling members, the chains are attached to the rotating members in opposite relation one to the other. Stated in another way, the horizontal and vertical attachments to the coupling members are such that where an attachment of the chain is made to one lug of one coupling member, the adjacent attachment of the companion chain is made to a corresponding lug on the other coupling member and similarly at all of the points of attachment. Thus, although each ring member is connected to both coupling members the axially adjacent or corresponding points of attachment are never to the same rotating member.

Figure 3:
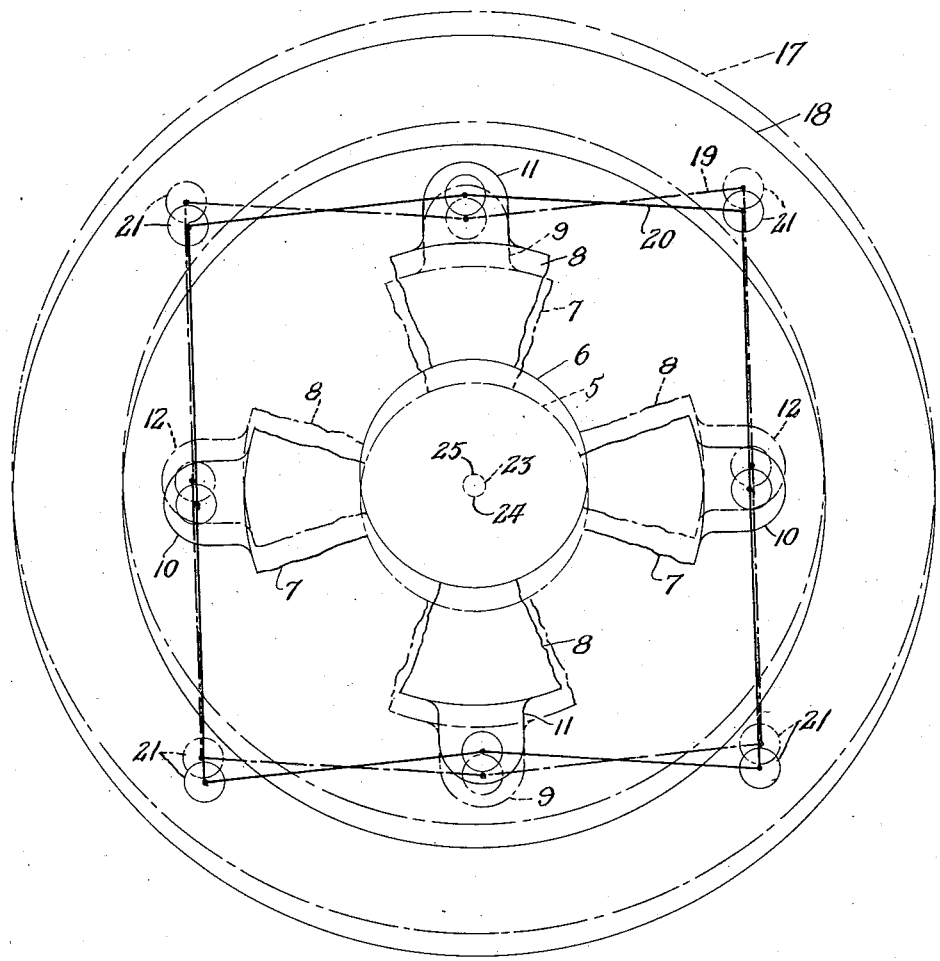
Fig. 3 is a more or less diagrammatic face view illustrating the relative positions of the parts with the shafts in parallel misalignment.

The effect of this arrangement is such that when the shafts are in parallel misalignment, as illustrated in Fig. 3, the axis of one of the floating rings is made to swing in a circle, indicated at 23 in Fig. 3, centered around a point mid-way between the shaft centers 24 and 25 and in the same manner the other floating member will have its axis forced to follow in the same circle but displaced 180° to the former, thus producing an automatic balancing of the coupling.

With reference to the diagrammatic showing in Fig. 3, it is pointed out the parts shown in full lines are those located in the transverse plane of the right hand set of lugs 10 and 11 of Fig. 1, and that the parts shown in dot and dash lines are those located in the transverse plane of the left hand set of lugs 9 and 12. The chain 20 is diagrammatically shown as a heavy full line and the chain 19 as a heavy dot and dash line.

The floating rings 17 and 18 and the flexible elements 19 and 20 are encased by means of a split cover 26 clamped to one of the coupling members, in this instance the member 7, and having oil-tight connection with the other member 8 by means of a yieldable oil ring 27 adapted to take care of misalignment of the shafts and coupling members.

I claim:

1. A coupling for a pair of rotating members comprising flexible means connecting said members for drive, said flexible means being connected to said members in alternation at circumferentially spaced points, and a second substantially counterpart flexible means connecting said members for drive, said second flexible means being connected to said members in alternation at circumferentially spaced points, the points of connection of one flexible means to either rotating member being axially opposed to the points of connection of the other flexible means to the other rotating member.

2. A flexible coupling comprising a driving member, having sets of external lugs in spaced transverse planes, a driven member having sets of external lugs in said planes interspersed with those of the driving member, ring members in surrounding relation to said members disposed in said planes, means forming a driving connection between the driving and driven members comprising a flexible element in each of said planes and means connecting each flexible element to the lugs and the ring member which lie in its plane.

3. A flexible coupling comprising, a driving shaft, a driven shaft, a driving member on the driving shaft having two sets of oppositely disposed external lugs each set being in a different transverse plane and one set being disposed at right angles to the other set, a driven member on the driven shaft having similarly arranged sets of lugs, said members being so relatively positioned in a direction longitudinally of the shafts that there is a set of lugs of each member in each of said planes, and means forming a flexible driving connection between said members comprising a ring member and a flexible element in each of said planes, and means for attaching each flexible element to the ring member and the lugs which lie in its plane.

4. A flexible coupling comprising in combination a driving member, a driven member, a pair of rings in longitudinally spaced and surrounding relation to said members, a pair of similarly spaced flexible connecting elements, means connecting each flexible element to the driving and driven members at spaced points circumferentially thereof with the points of connection of one element to the driving and driven members positioned adjacent the points of connection of the other element to the driven and driving members, and means connecting said elements to said rings at spaced points circumferentially thereof lying between said points of connection to said driving and driven members.

5. A flexible coupling comprising in combination a driving member, a driven member, a pair of rings in longitudinally spaced and surrounding relation to said members, a pair of similarly spaced flexible connecting elements, means connecting each flexible element to the driving and driven members at spaced points circumferentially thereof, means connecting said elements to said rings at spaced points circumferentially thereof lying between said points of connection to said members, the points of connection of one flexible element to the driving and driven members being axially opposed to the points of connection of the other flexible element to the driven and driving members respectively whereby one ring substantially balances the other in operation.

6. A flexible coupling comprising in combination, a driving shaft, a driven shaft, a driving member on the driving shaft having circumferentially spaced lugs arranged alternately in different transverse planes, a driven member on the driven shaft having similar lugs, said members being so relatively positioned in a direction longitudinally of the shafts that the lugs of the driving member in one plane are next to the lugs of the driven member in the other plane and that the lugs of the driven member in said first plane are next to the lugs of the driving member in said second plane, a pair of rings located in said planes and in spaced surrounding relation to said members, flexible elements in the spaces between the rings and members, means connecting said flexible elements to the lugs, and means connecting said flexible elements to the rings.

7. A flexible coupling comprising in combination, a pair of shafts, a pair of coupling members thereon, a pair of rings in longitudinally spaced and surrounding relation to said members, flexible elements for connecting said members and rings, means for attaching said flexible elements to the coupling members and rings at equally spaced circumferential points with the points of attachment to the coupling members alternating with the points of attachment to the rings, each coupling member having every other point of attachment in the transverse plane of one of the rings and the remaining points of attachment in the transverse plane of the other ring, and said coupling members being so relatively positioned in a direction longitudinally of the shafts that adjacent approximately axially aligned points of attachment are provided on opposite coupling members.

8. A flexible coupling for shafts having rotating members thereon comprising a pair of ring members spaced apart longitudinally of the coupling and in spaced surrounding relation to the rotating members, and flexible means for drivingly connecting said ring members and rotating members comprising a flexible element in the plane of one of the ring members having connection therewith and with each of the rotating members and a flexible element in the plane of the other of said ring members having connection therewith and with each of the rotating members, the said rotating members being so relatively positioned in a direction longitudinally of the shafts that adjacent approximately axially aligned points of attachment are provided on opposite rotating members whereby said ring members substantially balance each other in operation.

9. A coupling for a pair of rotatable members comprising a pair of individually complete flexible means, means connecting one of said pair of flexible means alternately to said rotatable members at successive circumferential points, and means laterally opposed to said first mentioned connecting means also connecting the other of said pair of flexible means alternately to the rotatable members, each pair of laterally opposed connecting means comprising a connection between one flexible means and one coupling member and a connection between the other flexible means and the other coupling member.

10. A flexible coupling comprising a driving member, a driven member, a pair of flexible means, and means connecting each of said flexible means to both the driving and driven members at spaced circumferential points with the connections to the driving member alternating with the connections to the driven member, and said connecting means being arranged in approximately axially aligned pairs, each comprising a connection to the driving member and a connection to the driven member.

11. A flexible coupling comprising in combination a driving member, a driven member, a pair of rings in longitudinally spaced and surrounding relation to said members, a pair of similarly spaced flexible connecting elements, means connecting each flexible element to the driving and driven members at spaced points circumferentially thereof, means connecting said elements to said rings at spaced points circumferentially thereof lying between said points of connection to said members, the points of connection of one flexible element to the driving member being axially opposed to the points of connection of the other flexible element to the driven member, and the points of connection of said one flexible element to the driven member being axially opposed to the points of connection of said other flexible element to the driving member.

DAVID B. PERRY.